United States Patent
Shaffer et al.

(10) Patent No.: US 9,217,241 B2
(45) Date of Patent: Dec. 22, 2015

(54) FLOW DIVERTER DEVICE

(71) Applicant: General Electric Company, Schenectady, NY (US)

(72) Inventors: Timothy Scott Shaffer, La Grange, KY (US); Michael Lee Alsip, Louisville, KY (US)

(73) Assignee: General Electric Company, Schenectady, NY (US)

( * ) Notice: Subject to any disclaimer, the term of this patent is extended or adjusted under 35 U.S.C. 154(b) by 388 days.

(21) Appl. No.: 13/692,081

(22) Filed: Dec. 3, 2012

(65) Prior Publication Data

US 2014/0151281 A1    Jun. 5, 2014

(51) Int. Cl.
  *E03B 1/00* (2006.01)
  *E03B 7/07* (2006.01)

(52) U.S. Cl.
  CPC ............ *E03B 7/074* (2013.01); *E03C 2201/40* (2013.01); *Y10T 137/87788* (2015.04)

(58) Field of Classification Search
  CPC ....... C02F 1/00; E03C 2201/40; E03B 7/074; Y10T 137/87788; Y10T 137/86566; Y10T 137/86541; Y10T 137/86823; Y10T 137/87571; Y10T 137/9464; Y10T 137/87579; Y10T 137/87724; Y10T 137/87909
  See application file for complete search history.

(56) References Cited

U.S. PATENT DOCUMENTS

| | | | |
|---|---|---|---|
| 3,233,865 A | 2/1966 | Panzica et al. | |
| 4,044,789 A | 8/1977 | Elmore | |
| 4,318,424 A | 3/1982 | Bajka | |
| 4,812,082 A * | 3/1989 | Cooper | 405/36 |
| 5,069,782 A | 12/1991 | Moyher, Jr. et al. | |
| 5,279,329 A | 1/1994 | Pippel | |
| 5,510,031 A | 4/1996 | Knauf, Jr. et al. | |
| 5,581,826 A | 12/1996 | Edwards | |
| 6,050,286 A * | 4/2000 | Kruer et al. | 137/119.03 |
| 6,457,589 B1 | 10/2002 | Poirier et al. | |
| 6,675,834 B1 * | 1/2004 | Lai | 137/625.47 |
| 6,941,968 B2 | 9/2005 | Vidal | |
| 2006/0162793 A1* | 7/2006 | Di Nunzio | 137/625.46 |
| 2008/0110512 A1 | 5/2008 | Giagni et al. | |
| 2009/0090414 A1 | 4/2009 | Di Nunzio | |
| 2009/0095353 A1 | 4/2009 | Arsin | |
| 2009/0211654 A1 | 8/2009 | Nobili | |
| 2010/0126613 A1 | 5/2010 | Campbell et al. | |
| 2010/0193043 A1* | 8/2010 | Erhardt | 137/215 |
| 2011/0193002 A1* | 8/2011 | Shen et al. | 251/209 |

(Continued)

OTHER PUBLICATIONS

U.S. Appl. No. 13/692,105, filed Dec. 3, 2012, Timothy Scott Shaffer, et al.

(Continued)

*Primary Examiner* — Jessica Cahill
(74) *Attorney, Agent, or Firm* — Dority & Manning, P.A.

(57) ABSTRACT

A flow diverter device includes a diverter body. The diverter body defines therein two inlet channels and an outlet channel and includes a diverter valve defining therein a connecting channel. The diverter valve is movable between a first position wherein the connecting channel fluidly connects one of the inlet channels with the outlet channel only and a second position wherein the connecting channel fluidly connects the other of the inlet channels with the outlet channel only. The flow diverter device further includes a sleeve component including a secondary inlet channel and a secondary outlet channel. The sleeve component is connectable to the diverter body.

18 Claims, 5 Drawing Sheets

(56) References Cited

U.S. PATENT DOCUMENTS

| | | | |
|---|---|---|---|
| 2012/0048313 A1* | 3/2012 | Armstrong et al. | 134/56 D |
| 2013/0220460 A1* | 8/2013 | Kopp et al. | 137/603 |
| 2013/0228247 A1* | 9/2013 | Baumann | 137/887 |
| 2014/0150906 A1 | 6/2014 | Shaffer | |
| 2014/0151280 A1 | 6/2014 | Shaffer | |

OTHER PUBLICATIONS

U.S. Appl. No. 13/692,070, filed Dec. 3, 2012, Timothy Scott Shaffer.
Office action issued in connection with related U.S. Appl. No. 13/692,105 dated Aug. 14, 2014.

* cited by examiner

FLOW DIVERTER DEVICE

BACKGROUND

The subject matter disclosed herein relates generally to a flow diverter device, and more particularly to a flow diverter device that can be used in a water filtration system.

Various systems exist that aim to partition and/or direct incoming fluids to one or more particular outlets. By way of example, a water filtration system, which can include inlet/outlet tubing, a manifold and a filter component, receives untreated water, directs the water into a filter media, which subsequently directs the treated/filtered water back out for use.

In furtherance of this example, it is common for consumers to install a water filtration system under their sink and to have the system direct treated water to an auxiliary above-the-sink faucet. However, many consumers find having a second faucet undesirable, as it can be considered a detriment to the overall appearance of the sink and the kitchen. Accordingly, a need exists to produce a more convenient or desirable means of selecting between multiple fluid types (for example, treated or untreated water in the case of a water filtration system) and directing the selected fluid toward a common outlet or destination. Additionally, as power is not always available in various settings, it may be further desirable that the selection means not be electrically actuated, but rather mechanically based.

BRIEF DESCRIPTION OF EXAMPLE EMBODIMENTS OF THE INVENTION

As described herein, the exemplary embodiments of the present invention overcome one or more disadvantages known in the art.

A first aspect of the invention includes a flow diverter device that comprises a diverter body defining therein two inlet channels and an outlet channel and comprising a diverter valve defining therein a connecting channel, wherein the diverter valve is movable between a first position where the connecting channel fluidly connects one of the inlet channels with the outlet channel only and a second position where the connecting channel fluidly connects the other of the inlet channels with the outlet channel only, and a sleeve component comprising a secondary inlet channel and a secondary outlet channel, the sleeve component being connectable to the diverter body.

A second aspect relates to a system comprising a flow diverter device as detailed in the first aspect of the invention above, also comprising a faucet and a water filter apparatus.

These as well as other aspects and advantages of the present invention will become apparent from the following detailed description considered in conjunction with the accompanying set of drawings. It is to be understood, however, that the accompanying drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF EXAMPLE EMBODIMENTS OF THE INVENTION

As described herein, one or more embodiments of the invention include techniques and apparatuses for a flow diverting feature which can be implemented, by way of example, within the context of a water filtration system. An example of such a water filtration system may be found, for instance, installed in a domestic setting under a counter in conjunction with a faucet or faucets.

Specifically, an aspect of the invention includes a diverting feature provided with filtered and unfiltered water selection to a faucet and also employed with an air trap plumbing inlet connected to the dishwasher drain to direct drain water to the sink drain for an under-counter water filtration system. Moreover, in at least one example embodiment of the invention, the diverting device is employed with a diverter valve. By way merely of example, at least one embodiment of the invention includes a diverter valve that is connectable to two inlets and one outlet to provide either filtered or unfiltered water to the sink faucet upon selection by the consumer with the aid of a control knob on the counter-top which is connected to the diverter valve via a sealed stem.

Figure 1:
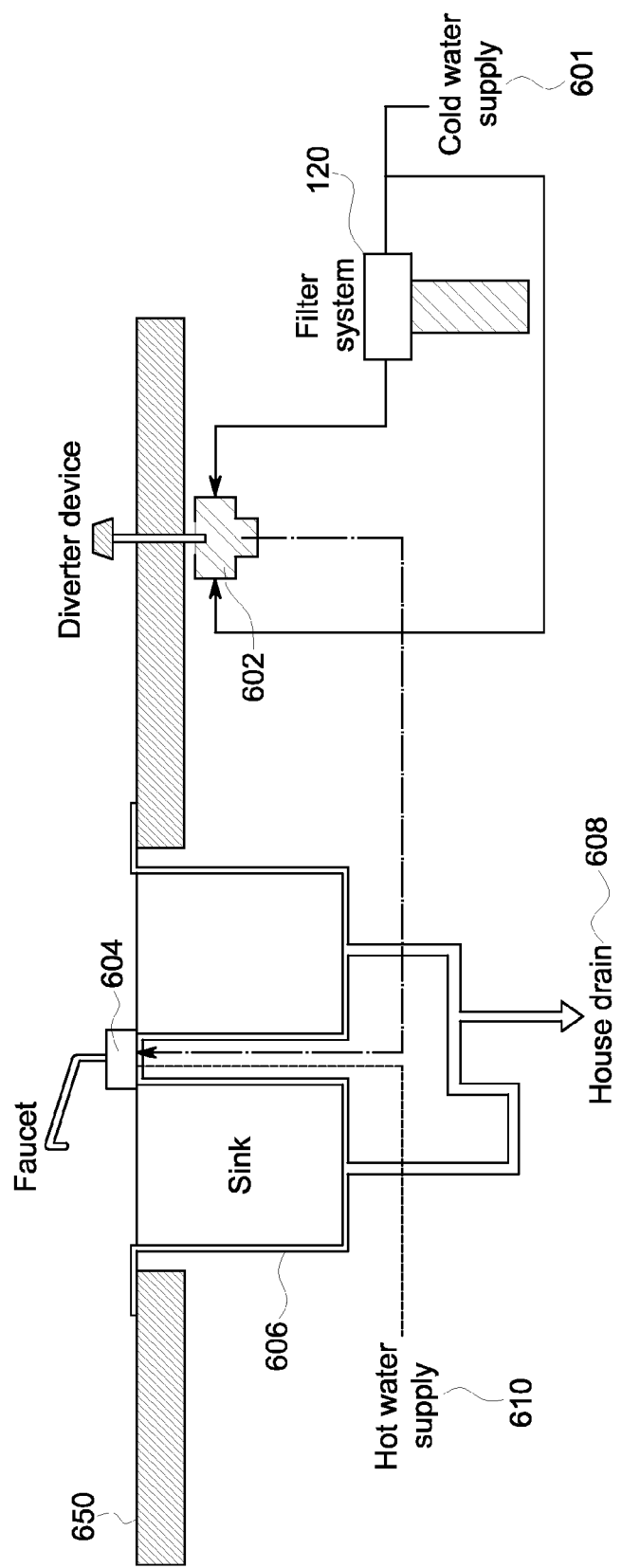
FIG. 1 illustrates a flow diverter in the context of a domestic water system, in accordance with a non-limiting example embodiment of the invention.

FIG. 1 illustrates a diverter feature in the context of a domestic water system, in accordance with a non-limiting example embodiment of the invention. By way of illustration, FIG. 1 depicts a cold water supply 601, which provides cold water to water filter apparatus/system 120 as well as to diverter device 602. Additionally, the filter system 120 provides filtered water to the diverter device 602. Diverter device 602 can provide a supply of cold and/or filtered water to faucet 604 within sink 606. Also, hot water supply 610 also provides a supply of water to faucet 604. Water (both hot and cold) can ultimately travel from sink 606 to house drain 608. Additionally, as depicted in FIG. 1, an example system such as this one can be implemented in and underneath a surface 650 such as a counter-top.

Figure 2:
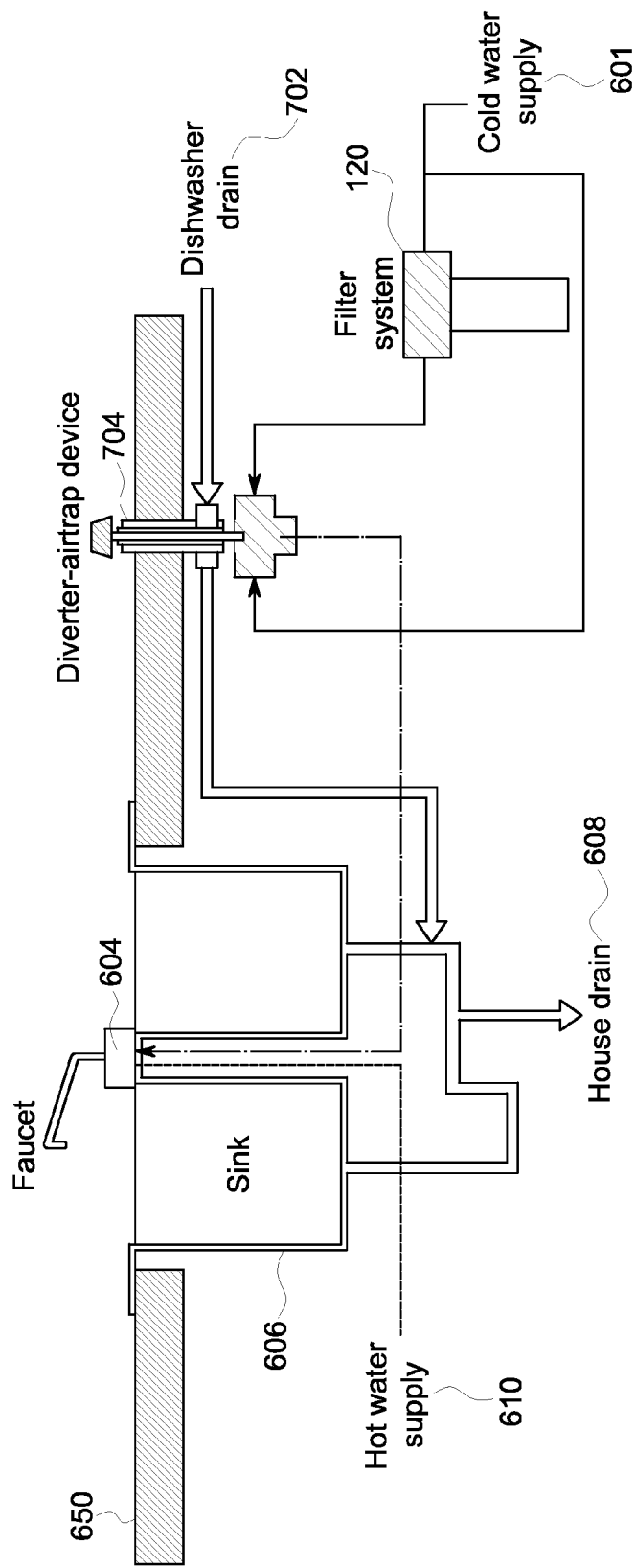
FIG. 2 illustrates a diverter feature provided integrally with a dishwasher air gap device in the context of a domestic water system, in accordance with a non-limiting example embodiment of the invention.

FIG. 2 illustrates a diverter feature provided integrally with a dishwasher air gap device in the context of a domestic water system, in accordance with a non-limiting example embodiment of the invention. By way of illustration, FIG. 2 depicts a cold water supply 601, which provides cold water to water filter apparatus 120 as well as to diverter-air-trap device 704. Additionally, the water filter apparatus 120 provides filtered water to diverter-air-trap device 704. Diverter-air-trap device 704 can provide a supply of cold and/or filtered water to faucet 604. Also, hot water supply 610 also provides a supply of water to faucet 604. Water (both hot and cold) can ultimately travel from sink 606 and from the dishwasher drain 702 to house drain 608. Additionally, an example system such as this one can be implemented in and underneath a surface 650 such as a counter-top.

Figure 3:
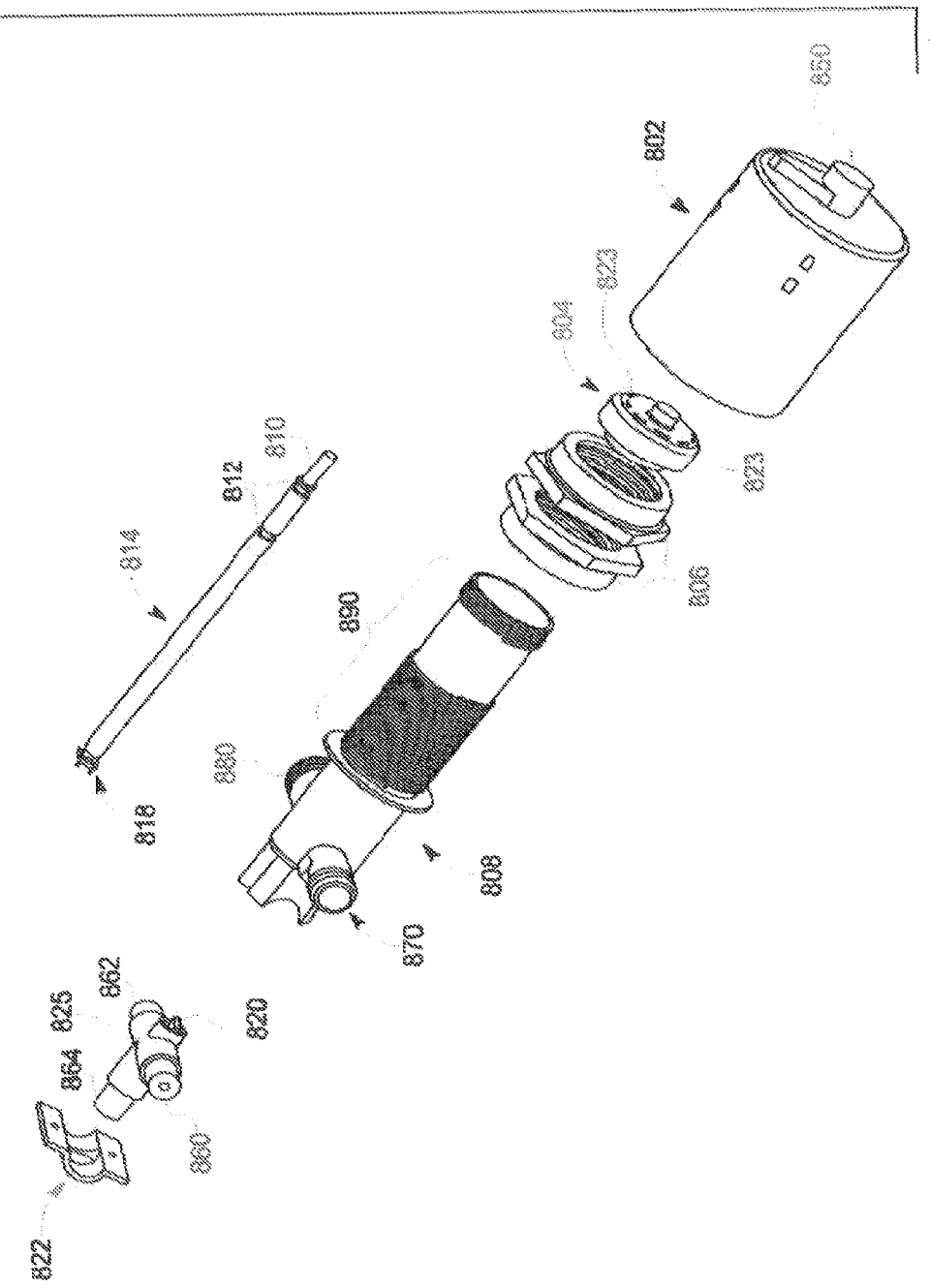
FIG. 3 illustrates an exploded view of various components of a diverter apparatus, in accordance with a non-limiting example embodiment of the invention.

FIG. 3 illustrates an exploded view of various components of diverter device (such as 602 or 704), in accordance with a non-limiting example embodiment of the invention. By way of illustration, FIG. 3 depicts diverter cover 802, which includes a knob 850, a flow director cap 804 and fastening nuts 806. As additionally described in connection with FIG. 4, vents 823 are located on a surface of the flow director cap 804 to permit the flow of air. Additionally, FIG. 3 depicts a sleeve component (also referred to herein as penetration sleeve component) 808, which includes a threaded flow director 890 and secondary flow channels (described further in connection with FIG. 5) including drain inlet 870 and drain outlet 880. Also, FIG. 3 shows diverter valve stem or valve stem 814 which includes d-shaft 810, o-ring seal grooves 812, a snap ring (not specifically depicted in FIG. 3) and engagement bracket 818. Further, FIG. 3 also depicts a diverter body 825 that is connectable to sleeve component 808, and includes a diverter valve 820 (for example, a three-port micro-ball valve) with guest fittings and restraining bracket 822. The diverter body 825 also includes inlets 860 and 862 and outlet (or exhaust) 864, each having a speed fit connector inserted to fasten and seal against inlet and outlet tubing (not shown), respectively.

Figure 4:
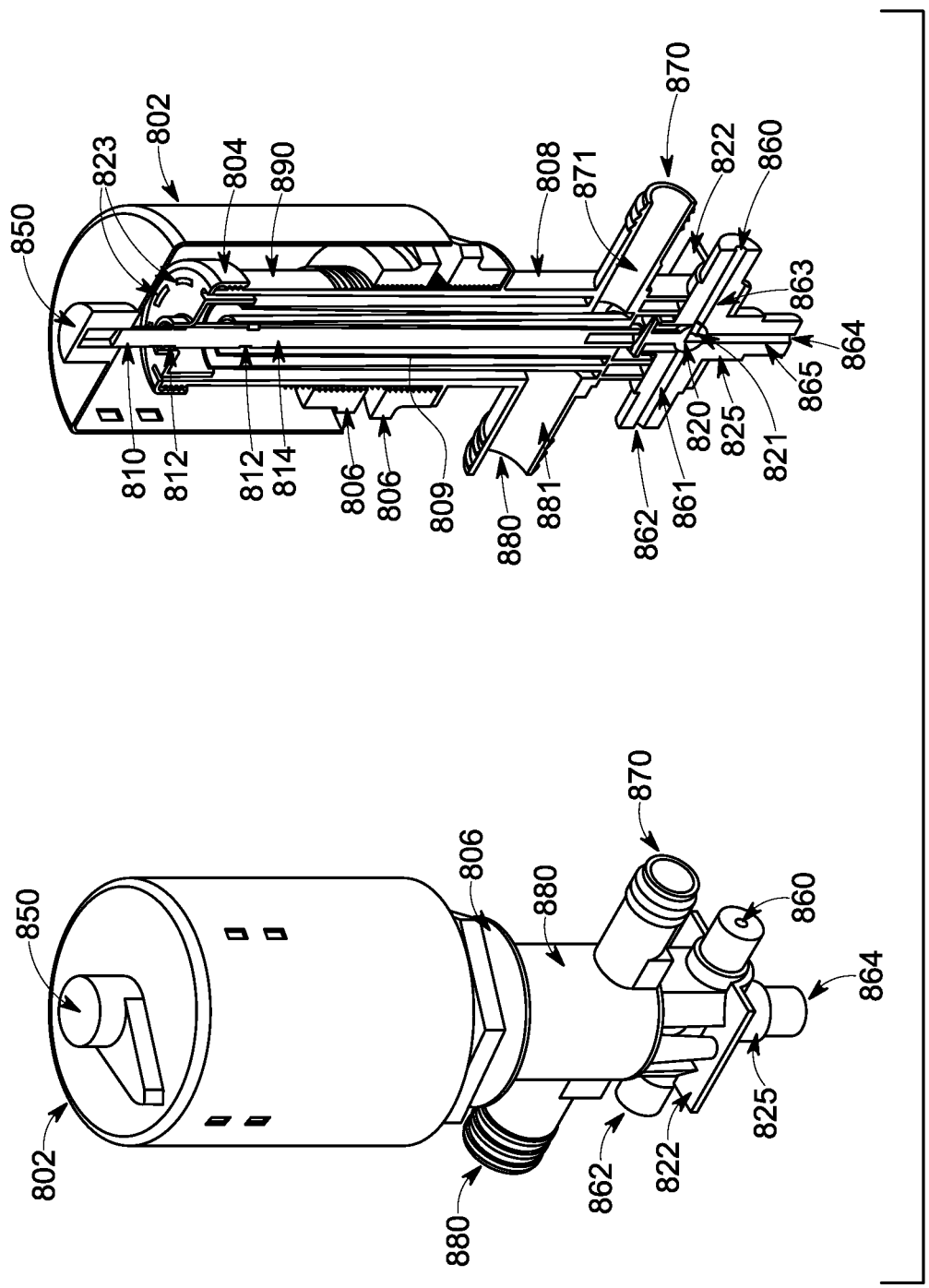
FIG. 4 illustrates an exterior view and a cross-section view of a diverter apparatus, in accordance with a non-limiting example embodiment of the invention.

FIG. 4 illustrates an exterior view and a cross-section view of diverter device (such as 602 or 704), in accordance with a non-limiting example embodiment of the invention. As illustrated, FIG. 4 depicts a consumer interface such as knob 850, valve stem 814 penetrating through penetration sleeve component 808, fastening nuts 806 for positioning and locking the diverter device (602 or 704) in place with respect to a surface such as a countertop, threaded flow director 890, portion of the penetration sleeve component 808, diverter valve 820, corresponding speed fit barbed connectors (formed into the inlet and outlet points) and fastening bracket 822. Additionally, as further described herein, an outer flow surrounding the valve stem 814 and penetration sleeve component 808 combined with the flow director cap 804 forms an air trap.

By way of example, dishwasher drain 702 can be connected to the drainage inlet 870 which provides a flow opening to secondary inlet channel 871, such that drain water is directed through the penetration sleeve component 808 through a vented connection. The drain water is then directed to a separate drain outlet 880 through secondary outlet channel 881, and on to the sink drain 608 (FIG. 2).

The knob 850, via a sealed connection with diverter valve stem 814, controls the flow of water from either the filtered or unfiltered flow streams. Additionally, in at least one embodiment of the invention, the knob 850 can be positioned above a sink (such as 606), while the plumbing connections and the valve can be underneath a counter (such as 650). In one or more embodiments of the invention, this arrangement can be realized through a separate countertop penetration away from the air-trap penetration. In such an embodiment, the diverter valve 820 of diverter body 825 is under the counter 650, but only the knob 850 and part of valve stem 814 extend above the counter 650.

Figure 5:
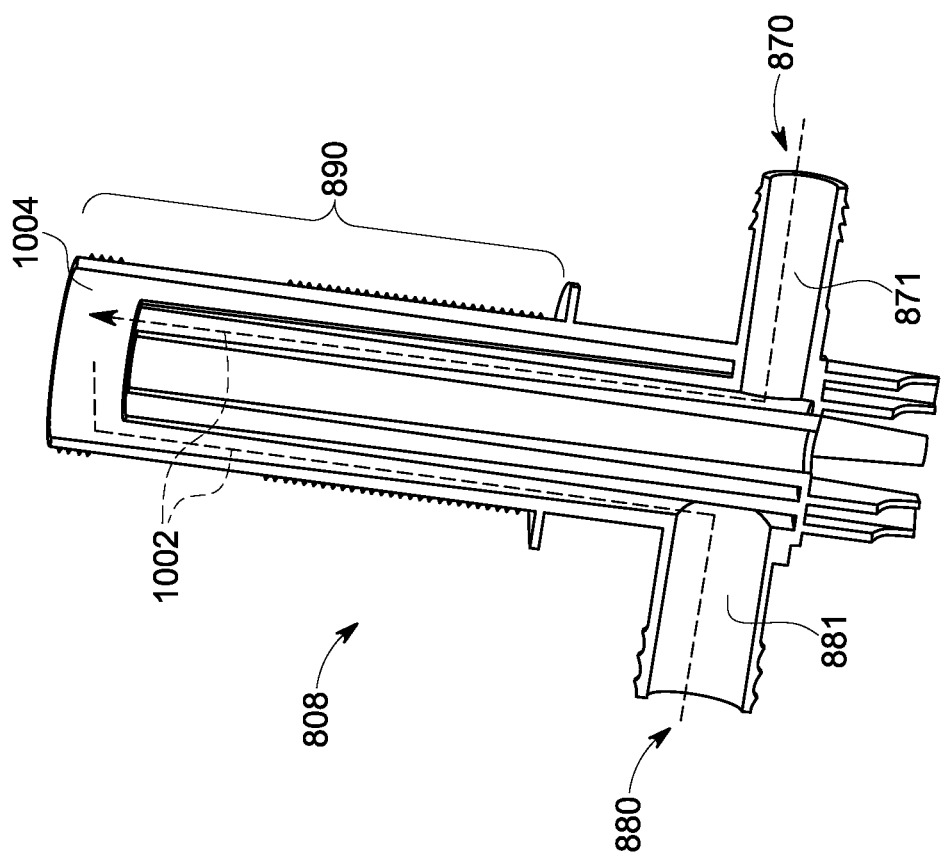
FIG. 5 illustrates a cross-section view of the flow director component of a diverter apparatus, in accordance with a non-limiting example embodiment of the invention.

Additionally, at least one embodiment of the invention includes a separate drain inlet 870 (an opening for secondary inlet channel 871) and drain outlet 880 (an opening for secondary outlet channel 881) that are exposed under the counter 650 and connected via an inner flow channel (such as, for example, inner flow channel 1002 shown in FIG. 5). Internally, drainage from the dishwasher is directed through cylindrical conduit/penetration sleeve component 808 that encompasses an isolation conduit 809 which is configured to receive part of the valve stem 814. A seal (formed, for example, via o-rings that can be displace is o-ring seal grooves 812) is used to restrict leakage through the valve stem 814 during dishwasher operation. The outer periphery of the penetration sleeve component 808 and the threaded flow direction 890 define the inner flow channel for the drainage so that the drainage is obstructed and forced to return through secondary outlet channel 881 and out the drain outlet 880, and the drain outlet 880 fluidically seals and directs drainage back to the exhaust line. The flow director 890 has an air gap (such as, for example, air gap 1004 depicted in FIG. 5) included inside of its exterior walls to provide a vented atmosphere. As also depicted in FIG. 4, vents 823 are located on the outer periphery top surface of the flow director cap 804 to permit the flow of air from the air gap. The air gap forms the uppermost segment of the inner flow channel, which is vented by the vents 823.

Further, FIG. 4 depicts the diverter body 825, which includes the diverter valve (for example, a three-port ball valve) 820 with connecting channel 821 defined therein. The diverter body 825 is connected to the bottom of the penetration sleeve component 808 with the valve stem 814 structurally connecting to the diverter valve 820, and extending upward through the penetration sleeve component 808 and flow director cap 804 until it (that is, the valve stem 814) is attached via a d-shaped shaft 810 to control knob 850.

As also depicted in FIG. 4, diverter body 825 includes inlet 860 providing a flow opening to inlet channel 863 defined within the diverter body 825, inlet 862 providing a flow opening to inlet channel 861 defined within the diverter body 825, and outlet 864 providing a flow opening to outlet channel 865 defined within the diverter body 825. Inlet channel 863, inlet channel 861 and outlet channel 865 are operably fluidly connectable to diverter valve 820 via connecting channel 821, and inlet 862, inlet 860 and outlet 864 can each have a speed fit connector inserted to fasten and seal against inlet and outlet tubing (as would be appreciated by one skilled in the art). In an example embodiment of the invention, one of the inlets receives unfiltered water, while the other inlet receives filtered water (for example, from a water filter apparatus 120). The outlet 864, depending on the position of the consumer knob 850, will either supply filtered or unfiltered water to the sink faucet 604.

Accordingly, at least one embodiment of the invention includes a diverting device (such as 602 or 704) that activates the treated versus untreated water flow through rotation of knob 850. As detailed herein, diverter valve stem 814 links the rotation of the knob 850 to the diverter valve 820, the diverter valve 820 being movable between a first position and a second position. For example, by turning the knob 850 and moving the diverter valve 820 to a first position, the connecting channel 821 of diverter valve 820 fluidly connects one of the inlet channels (for example, 863) of diverter body 825 with the outlet channel 865 of diverter body 825 only. This can, in an example embodiment of the invention, open a flow path to allow the introduction of unfiltered or untreated water into unfiltered water inlet (for example, 860) and out exhaust 864 towards the faucet 604 (while closing the flow path facilitating the processing of filtered water). Further, by turning the knob 850 and moving the diverter valve 820 to a second position, the connecting channel 821 of diverter valve 820 fluidly connects the other of the inlet channels (for example, 861) of diverter body 825 with the outlet channel 865 of diverter body 825 only. This can, in an example embodiment of the invention, open a flow path to allow the flow of filtered water through filtered water inlet (for example, 862) and out exhaust/outlet 864 on towards the faucet 604 (while closing the flow path for the unfiltered water).

Additionally, as noted, a secondary water flow path is included in at least one embodiment of the invention to permit drainage (for example, dishwasher drainage) to circulate around the threaded flow director 890 and above the diverter body 825.

Accordingly, in conjunction with the above descriptions, FIG. 5 illustrates a cross-section view of the penetration sleeve component 808, in accordance with a non-limiting example embodiment of the invention. Specifically, penetration sleeve component 808 includes threaded flow director 890, and an inner flow channel 1002 with an air gap 1004 at the portion on the opposite end of the component from the drain inlet 870 and drain outlet 880 (the flow director cap 804 is not shown in FIG. 5). As also depicted in FIG. 5, fluid from drainage such as dishwasher drainage can enter drain inlet 870, travel through secondary inlet channel 871 and around inner flow channel 1002, and ultimately exit through secondary outlet channel 881 out drain outlet 880 (as illustrated by the dashed arrows in FIG. 5) to, for example, a main drain pipe under the sink in a domestic setting.

Accordingly, while there have shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A flow diverter device comprising:
   diverter body defining therein two inlet channels and an outlet channel and comprising a diverter valve defining therein a connecting channel, wherein the diverter valve is movable between a first position where the connecting channel fluidly connects one of the inlet channels with the outlet channel only and a second position where the connecting channel fluidly connects the other of the inlet channels with the outlet channel only; and
   a sleeve component comprising a secondary inlet channel and a secondary outlet channel, the sleeve component being connectable to the diverter body,
   wherein the sleeve component further comprises an inner flow channel connecting the secondary inlet channel with the secondary outlet channel, and wherein the inner flow channel comprises an uppermost segment which is vented.

2. The flow diverter device of claim 1, wherein the diverter valve comprises a three-port hall valve.

3. The flow diverter device of claim 1, wherein the sleeve component comprises at least one fastening nut for positioning the flow diverter device with respect to a surface.

4. The flow diverter device of claim 1, further comprising a diverter valve stem connectable to the diverter valve.

5. The flow diverter device of claim 4, wherein the sleeve component comprises an isolation conduit configured to receive part of the diverter valve stem.

6. The flow diverter device of claim 4, further comprising a diverter selection mechanism connected to the diverter valve stem, wherein rotation of the diverter selection mechanism moves the diverter valve between the first position and the second position.

7. The flow diverter device of claim 6, wherein the diverter selection mechanism comprises a knob.

8. The flow diverter device of claim 7, wherein rotation of the diverter selection mechanism comprises manual rotation of the knob.

9. A system comprising:
   a faucet;
   a water filter apparatus; and
   a flow diverter device comprising:
      a diverter body defining therein two inlet channels and an outlet channel and comprising a diverter valve defining therein as connecting channel,
      wherein the diverter valve is movable between a first position where the connecting channel fluidly connects one of the inlet channels with the outlet channel only and a second position where the connecting channel fluidly connects the other of the inlet channels with the outlet channel only; and
   a sleeve component comprising a secondary inlet channel and a secondary outlet channel, the sleeve component being connectable to the diverter body,
   wherein the sleeve component further comprises an inner flow channel connecting the secondary in let channel with the secondary outlet channel, and wherein the inner flow channel comprises an uppermost segment of which is vented.

10. The system of claim 9, wherein the diverter valve comprises a three-port ball valve.

11. The system of claim 9, wherein the sleeve component comprises at least one fastening nut for positioning the flow diverter device with respect to a surface.

12. The system of claim 9, wherein one of the inlet channels is fluidly connectable to an unfiltered fluid source.

13. The system of claim 12, wherein the other of the inlet channels is fluidly connectable to the unfiltered fluid source via the water filter apparatus.

14. The system of claim 13, wherein the outlet channel is fluidly connectable to the faucet.

15. The system of claim 9, further comprising a diverter valve stem connectable to the diverter valve.

16. The system of claim 15, wherein the sleeve component comprises an isolation conduit configured to receive part of the diverter valve stem.

17. The system of claim 15, further comprising a diverter selection mechanism connected to the diverter valve stem, wherein rotation of the diverter selection mechanism moves the diverter vale e between the first position and the second position.

18. The system of claim 17, wherein the diverter selection mechanism comprises a knob.

* * * * *